United States Patent
Okaizumi et al.

(10) Patent No.: US 7,132,120 B2
(45) Date of Patent: Nov. 7, 2006

(54) METHOD AND APPARATUS FOR PRODUCING A CONTINUOUS FOOD SHAPED AS A BAR AND A BELT CONVEYOR USED FOR ITS PRODUCTION

(75) Inventors: Hiroyuki Okaizumi, Utsunomiya (JP); Hiroyuki Yamanaka, Utsunomiya (JP)

(73) Assignee: Rheon Automatic Machinery Co., Ltd. (JP)

( * ) Notice: Subject to any disclaimer, the term of this patent is extended or adjusted under 35 U.S.C. 154(b) by 395 days.

(21) Appl. No.: 10/375,552

(22) Filed: Feb. 27, 2003

(65) Prior Publication Data

US 2003/0228396 A1    Dec. 11, 2003

(30) Foreign Application Priority Data

Jun. 7, 2002    (JP)  .............................. 2002-167647

(51) Int. Cl.
*A21C 3/06*    (2006.01)
(52) U.S. Cl. ...................... 426/297; 426/501; 426/502; 99/450.1; 99/450.2; 425/335; 425/373; 425/505
(58) Field of Classification Search ................ 426/297, 426/500, 501, 502; 99/450.1–450.2; 425/335, 425/363, 505, 373
See application file for complete search history.

(56) References Cited

U.S. PATENT DOCUMENTS 1,176,648 A * 3/1916 Callow ........................ 425/343
2,960,045 A 11/1960 Pentzlin
3,953,613 A * 4/1976 Morgenthaler et al. ..... 426/502
4,457,225 A * 7/1984 Bakker ....................... 99/450.6
6,001,403 A * 12/1999 Kobayashi ................... 426/297
6,817,850 B1 * 11/2004 Kobayashi et al. ......... 425/112

FOREIGN PATENT DOCUMENTS

| AU | 566508 B | 10/1987 |
|---|---|---|
| DE | 8906356 U | 10/1989 |
| FR | 2649591 | 1/1991 |
| FR | 2649591 | * 10/1991 |
| JP | 8-242750 | 9/1996 |
| JP | 08-242750 | * 9/1996 |
| NL | 9202191 | 7/1994 |
| WO | WO 98/25480 | 6/1998 |

* cited by examiner

*Primary Examiner*—Drew Becker
(74) *Attorney, Agent, or Firm*—Jackson Walker, LLP (57) ABSTRACT

A method for producing a food shaped as a continuous bar by placing a continuous inner material on a continuous strip of an outer layer material that is transferred on a former belt, comprising the steps of placing food material that includes the inner material placed on the strip of the outer layer material in a channel space defined by the former belt while it is running; and shaping part of the former belt that is located at the channel space as a sleeve by pushing and joining edges of the former belt by a pushing device to allow edges of the outer layer material to be joined.

7 Claims, 7 Drawing Sheets

Fig. 7C

METHOD AND APPARATUS FOR PRODUCING A CONTINUOUS FOOD SHAPED AS A BAR AND A BELT CONVEYOR USED FOR ITS PRODUCTION

FIELD OF THE INVENTION

This invention relates to a method and an apparatus for producing a piece of food shaped as a continuous bar that has an inner material such as jam or other filling and an outer layer material (e.g. dough) that surrounds the inner material. The invention also relates to a belt conveyor used for producing the continuous piece of food.

DESCRIPTION OF THE PRIOR ART

Japanese Patent 8-242750 A (prior art 1) and Japanese Patent 2896503 B (prior art 2) disclose such a method, apparatus, and belt conveyor.

In prior art 1, a continuous outer layer material is shaped as a strip and placed on an endless belt conveyor that runs horizontally, and a continuous inner material shaped as a bar, which is to be surrounded by the outer layer material, is placed on the strip of the outer layer at its center (center of its width). Both edges of the upper part of the endless, horizontal belt conveyor are then forced to curve upward by rollers so that the outer layer material surrounds the inner material.

Since in prior art 1 the horizontal belt conveyor is arranged so that both edges of its upper part are curved upward, the belt conveyor will be rather long in the direction that it runs, and the edges are subjected to great tension, thereby causing a problem in that the life of the belt conveyor is shortened.

Prior art 2 discloses a belt conveyor that comprises a V-shaped belt located at the center of the belt conveyor (center of Its width), a base belt disposed around the outer periphery of the V-shaped belt so that the base belt and the V-shaped belt form one body, and a plurality of strip belts disposed around the outer periphery of the base belt, which strip belts are arranged along the path in which the belt conveyor runs. In this belt conveyor the strip belts can be easily curved upward to wrap an inner material by an outer layer material that is placed on the belt conveyor. However, the structure of the belt conveyor is complicated. Further, part of the outer layer material or powder used or both may be caught between the strip belts and they may remain there. This requires troublesome cleaning of the strip belts.

The purpose of the present invention is to resolve this problem and those drawbacks of the prior art discussed above.

SUMMARY OF THE INVENTION

The method of the present invention for producing a piece of food shaped as a continuous bar by placing a continuous inner material on a continuous outer layer material that is shaped as a strip and transferred includes the steps of placing food material that includes the inner material placed on the strip of the outer layer material in a channel (or groove) space (or passage) defined by a former belt while it is running, and shaping the former belt into a sleeve such that both edges of the former belt are joined to shape the strip of the outer layer material as a sleeve that surrounds the inner material.

In one aspect of this invention the edges of the former belt are pressed together by pushing means or a plurality of especially-shaped guiding former members.

DESCRIPTION OF THE PREFERRED EMBODIMENTS

Below the embodiments of the present invention are explained in detail by reference to the accompanying drawings.

Figure 1:
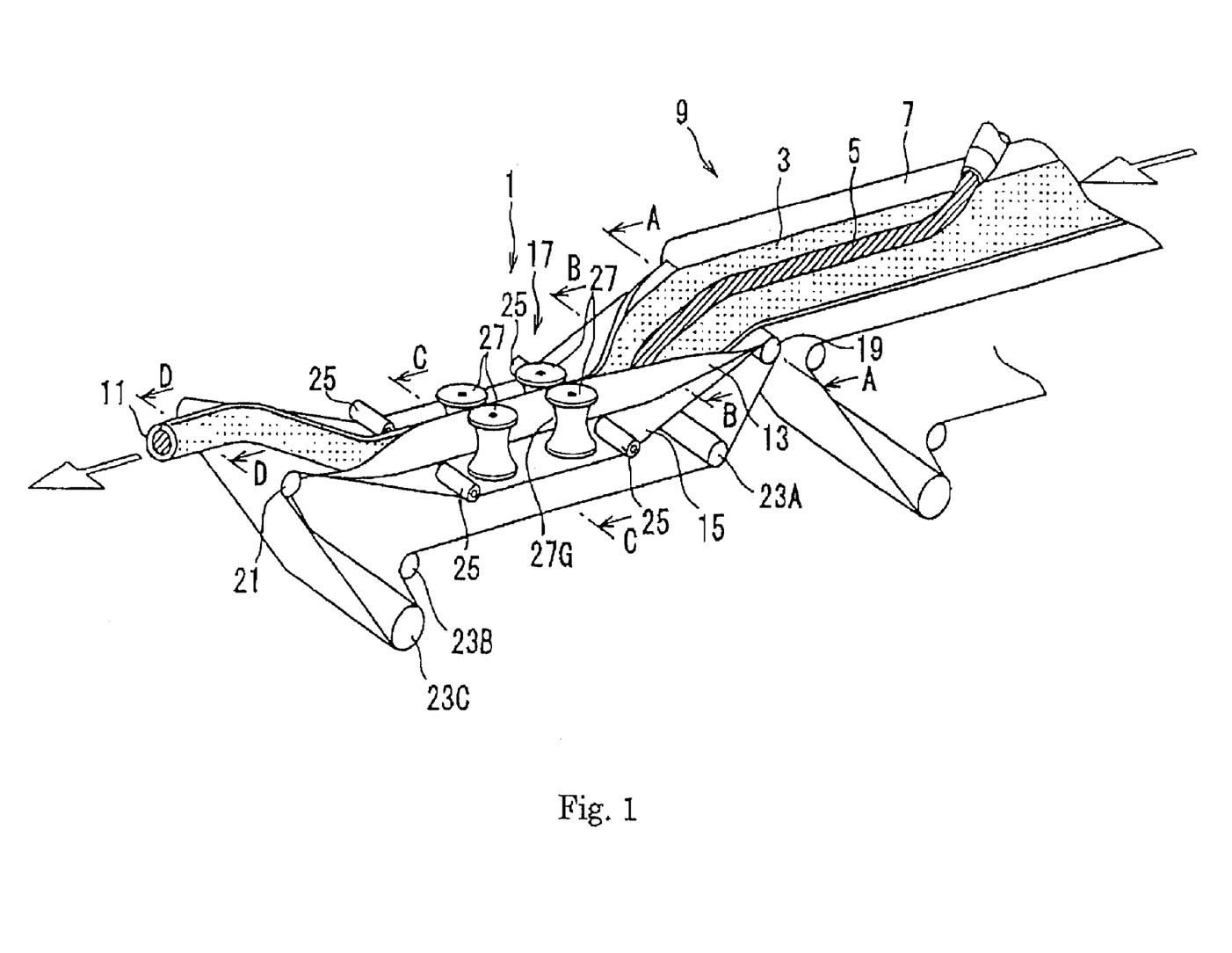
FIG. 1 is a perspective view showing a first embodiment of the apparatus of the present invention.

FIG. 1 and FIG. 2 (FIGS. 2A–2D) show the first embodiment of the apparatus 1 of the invention for producing a piece of food shaped as a continuous bar. In FIG. 1 the apparatus 1 is located between a transfer conveyer system 9 (to the right in the drawing) and a cutting machine (not shown) that cuts a produced piece of food shaped as a continuous bar (to the left in the drawing). The conveyor system 9 includes a transfer conveyor 7 that carries a continuous strip of an outer layer material 3 (e.g., dough), which is supplied by a device (not shown) for supplying a continuous strip of an outer layer material, and a continuous food material 5 shaped as a bar (e.g., jam or other filling), which is continuously supplied by a device (not shown) for supplying an inner material. The bar-like food material 5 is used as an inner material to be surrounded by the outer material 3.

As shown in FIG. 1, the apparatus 1 has a conveyor belt 17 comprising endless, two-layer belts, namely, a base belt (inner belt) 15 and a former belt (outer belt) 13, which is disposed on or above the outer surface of the inner belt 15. The conveyor belt 17 is supported and guided by a first guide roller 19 located at the upstream end (i.e., the starting end) of the conveyor belt 17 and a second guide roller 21 located at the downstream end (i.e., the turning end). Further, a plurality of intermediate rollers 23A, 23B, and 23C, which are properly spaced apart from each other, are disposed between the first and second guide rollers 19, 21. These intermediate rollers 23A, 23B, and 23C guide the lower part of the endless conveyor belt 17. By operating a controlling motor (not shown), the food materials (inner material 5 and outer layer material 3) are transferred to the left (in FIG. 1).

The endless conveyor belt 17 is so arranged that the central parts of both the inner and outer belts are fixed to each other by using proper fixing tools or an adhesive. The outer, former belt 13 is made of flexible material, so that it can be deformed into a sleeve when both edges of it are joined in a line parallel to the centerline of the conveyor belt 17.

A plurality of rollers 25 (e.g., 4 rollers, as shown in FIG. 1), for depressing and guiding the upper part of the endless, inner belt 15 at its upper surface, are disposed between and at a lower level of the first and second guide rollers 19, 21. These depressing rollers 25 are rotatably mounted on side frames (not shown) disposed at both sides of the conveyor belt 17. Since the rollers 25 depress the inner belt 15, they lower the central part of the upper part of the endless, outer belt 13 through the central part of the endless, inner belt 15, which part is fixed to the corresponding central part of the outer belt 13, thereby defining a channel (or groove) space in the upper part of the endless outer belt.

In the groove space the inner, base belt 15 is in a tensioned state due to the depressing rollers 25, but the upper surfaces of both sides of the inner, former belt 13 are free from any depression. Thus they can be easily curved upward without applying a great tension.

Two pairs of vertical, former rollers (rolls) 27, 27 are rotatably supported on brackets that are disposed at both sides of the channel space. The former rollers 27, 27 are located between the two pairs of depressing rollers 25, 25, with one pair (25, 25) located upstream and the other pair downstream of the channel space. Each former roller 27 has a curved outer surface 27G (e.g., a semicircular cross section) so that the outer belt 13 will be deformed in the shape of a sleeve when it passes between the former rollers 27 and 27, which are arranged at the sides of the channel space. The deformed outer belt 13 allows the outer layer material 3 to be wrapped around the inner material 5.

The brackets (not shown), which carry the former rollers 27, may be vibratingly moved in the right and left directions by actuators such as pneumatic actuators (not shown) such that the former rollers 27, 27, located at the sides of the channel space, closely approach each other (thereby securing the edges of the outer belt 13 to each other) and move away from each other. By those vibrations, repeated forces are applied to the outer belt 13 and hence to the outer layer material 3, so that the outer layer material 3 securely wraps the inner material 5, and so that the edge surfaces 3A (FIG. 2C) of the outer layer are joined.

Some steps of the operation of the apparatus explained above are shown in FIGS. 2A–2D.

Figure 2A:
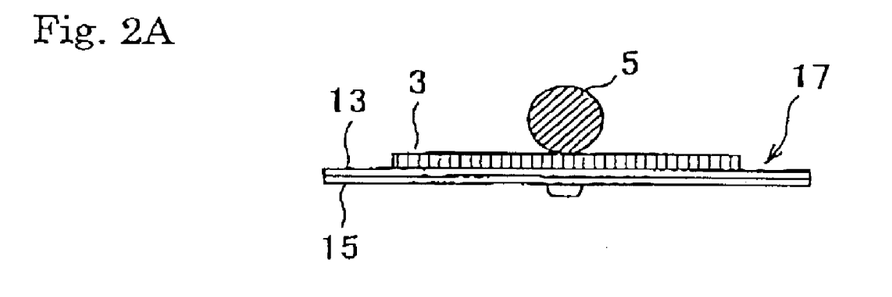
FIG. 2A is a cross-sectional view taken along the cutting line A—A in FIG. 1.
Figure 2B:
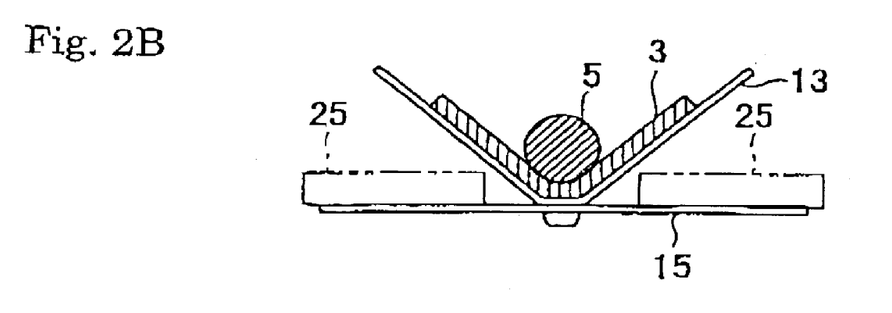
FIG. 2B is a cross-sectional view taken along the cutting line B—B in FIG. 1.

FIG. 2A shows the bar-like inner material 5 and the strip of the outer layer material 3 carried on the endless belt conveyor 17 at the position shown by cutting line A—A. As the inner material 5 and the outer layer material 3 come to the position shown by cutting line B—B, the inner belt 15 is lowered by the depressing rollers 25, 25, and thus the central part of the outer belt 13 is lowered by the inner belt 15, so that the channel passage is formed in the outer belt 13.

Figure 2C:
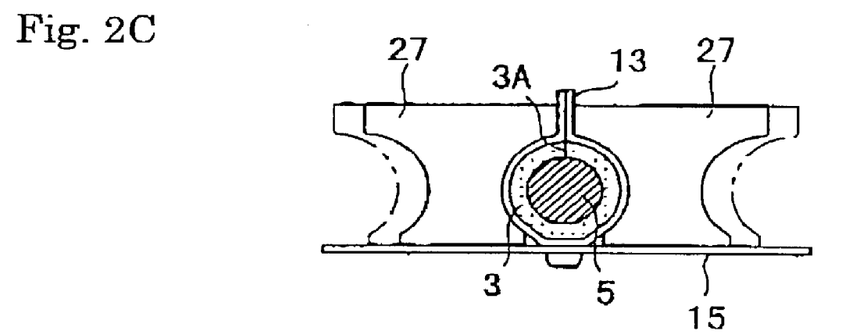
FIG. 2C is a cross-sectional view taken along the cutting line C—C in FIG. 1.
Figure 2D:
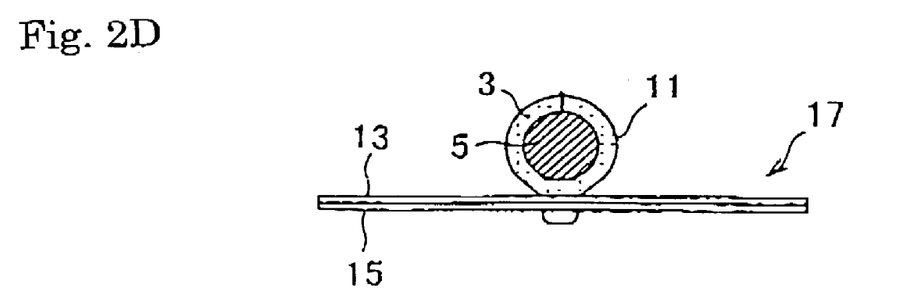
FIG. 2D is a cross-sectional view taken along the cutting line D—D in FIG. 1.

As in FIG. 2C, when the materials 3 and 5 come to the position shown by cutting line C—C, the former rollers 27, 17 are laterally vibrated to be made to come close to or move away from each other to make the outer belt 13 be in the shape of a sleeve, and to allow the edges of the belt 13 to be joined. Thus, as previously explained, the outer layer material 3 is to be wrapped around the inner material 5, and the edge surfaces 3A of the outer layer material engage with each other. The produced continuous piece of food, which is shaped as a bar (Fig. D), Is then moved away by a conveyor such as a conveyor 9B (shown in FIG. 3).

Now, the second embodiment is explained with reference to FIG. 3 and FIG. 4 (FIGS. 4A–4D). Also, some alternative examples are explained in FIGS. 5, 6, and 7. In these FIGS. (3–7) the same or similar numbers are used for the same or similar elements.

Figure 3:
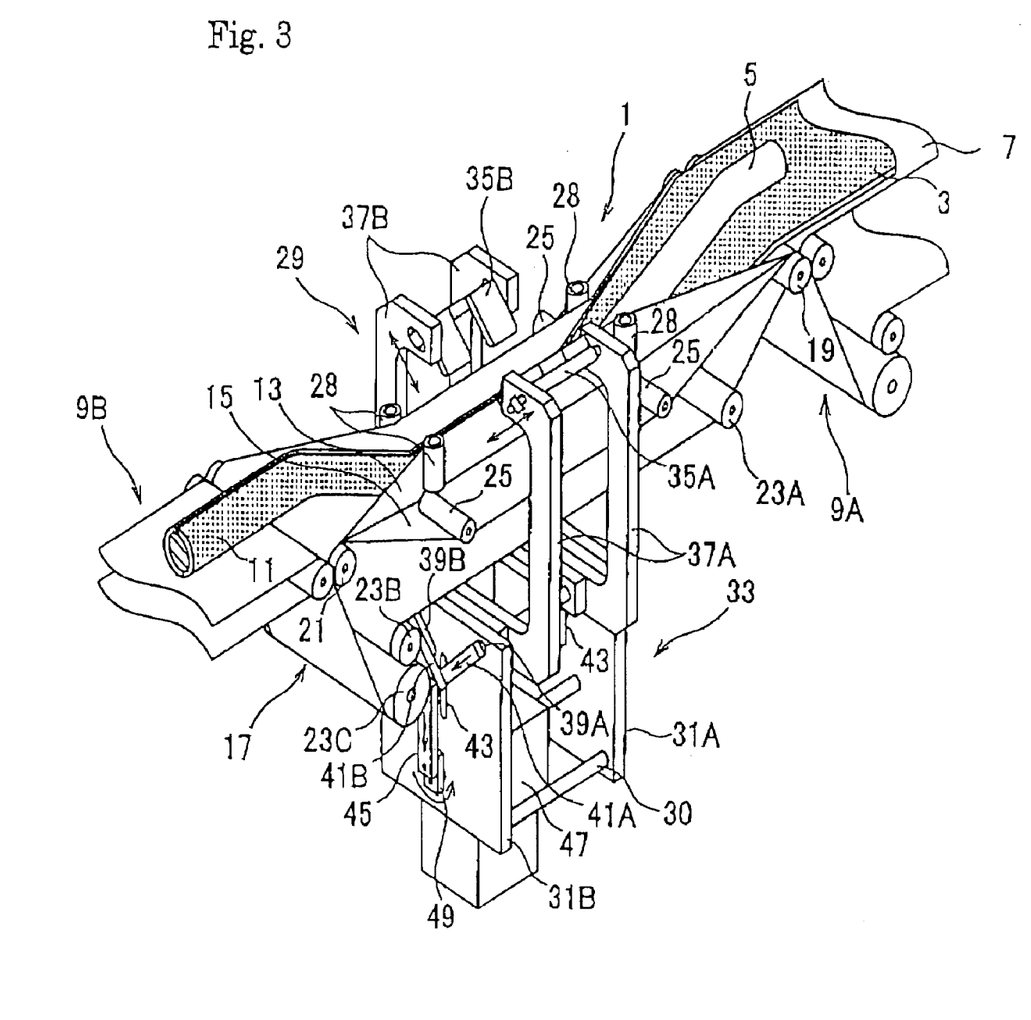
FIG. 3 is a perspective view showing a second embodiment of the apparatus of the present invention.

The apparatus 1 of the second embodiment shown in FIGS. 3 and 4 is similar to the apparatus 1 of the first embodiment shown in FIGS. 1 and 2 and differs in that it uses former rollers 28 and a pushing device 29 to make the outer layer material 3 be in the shape of a sleeve, instead of using the former rollers 27 that have a curved surface as in the first embodiment. Other elements function the same as those of the first embodiment. Thus no further explanation is made for those elements.

Figure 4A:
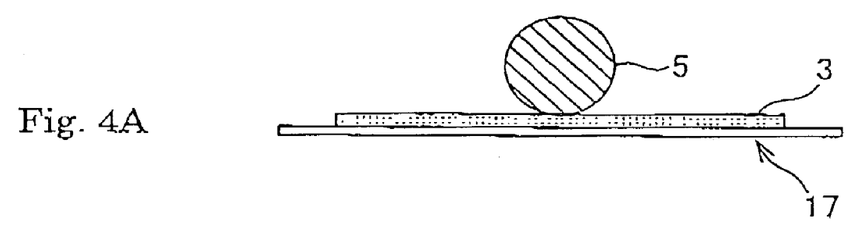
FIG. 4A is a cross-sectional view corresponding to FIG. 2A of the first embodiment, showing the inner material, the outer layer material, and the conveyor in the second embodiment.
Figure 4B:
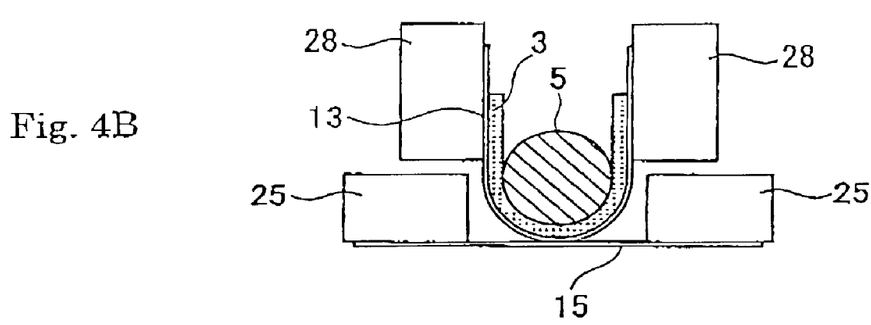
FIG. 4B is a cross-sectional view corresponding to FIG. 2B of the first embodiment, showing the inner material, the outer layer material, and the conveyor in the second embodiment.
Figure 4C:
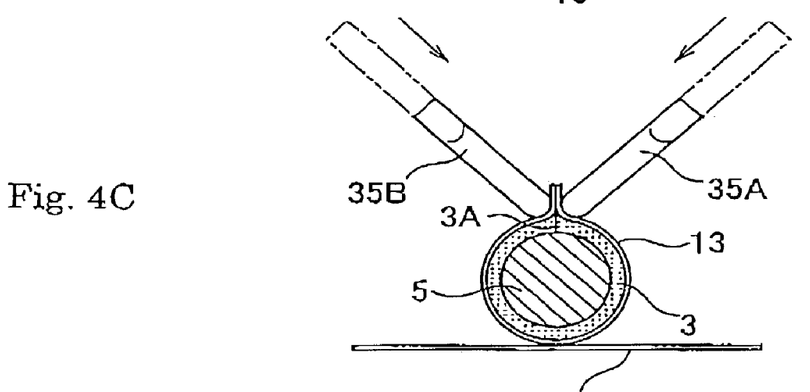
FIG. 4C is a cross-sectional view corresponding to FIG. 2C of the first embodiment, showing pushing members in the second embodiment to join the edges of the former belt.
Figure 4D:
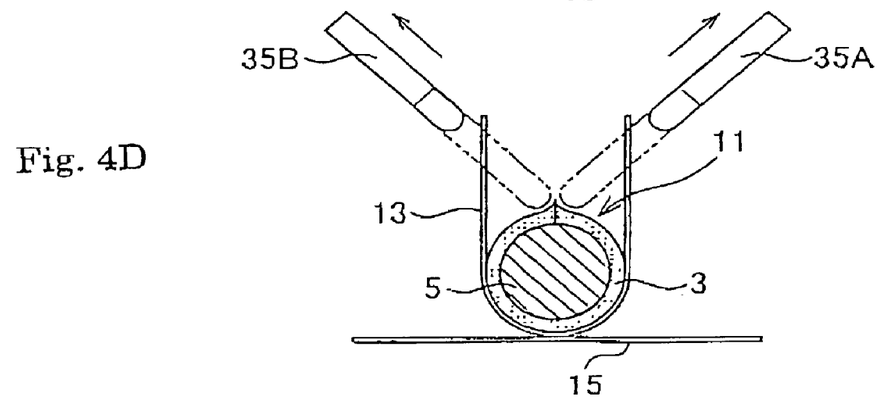
FIG. 4D is a cross-sectional view similar to FIG. 4C, showing the pushing members being moved away from the edges of the former belt.

Each former roller 28 has a straight outer surface as shown in FIGS. 3 and 4B. Thus, when the endless belt conveyor 17 shown in FIG. 4A comes to the groove passage, the outer, former belt 13 is bent like a "U" by the depressing rollers 25, 25, the inner belt 15, and the former rollers 28, 28, as in FIG. 4B. The edges of the outer belt 13 are then (preferably, repeatedly or vibratingly) pushed and joined together by pushing members 35A, 35B that are (preferably, vibratingly and) slantwise moved to join the edges.

The mechanism of the pushing device 29 that includes the pushing members 35A, 35B is now briefly explained.

The two pairs of pushing members 35A, 35B are symmetrically arranged at both sides of the groove passage and fixedly mounted on C-shaped frames 37a, 37B through attaching bars 35A. The C-shaped frames 37A (located at one side of the groove passage) are connected to sliders 41A, and the C-shaped frames 37B, located at the other side, are connected to sliders 41B. The sliders 41A and 41B are symmetrically slanted and are slidable in the notches 39A and 39B, respectively, which notches are formed in plates 31A, 31B. These plates are connected by bars 30 to form a frame 33.

An actuator 47, which is vertically moved, for example, by a servomotor, is disposed between the plates 31A, 31B. The actuator 47 operates to rotate crank members 49 to vertically move the sliders 41A, 41B through connecting rods 45 and guide members 43. Since the sliders 41A, 41B move slantwise simultaneously in the same direction. C-shaped frames 37A, 37B and the pushing members 35A, 35B move slantwise and simultaneously in the same direction, as shown by slanted arrows in FIGS. 3, 4C, and 4D. The forces applied slantwise to the outer layer material better secure the bonding of the edge surfaces of the outer layer material.

Since the width of inner belt 15 is less than that of the outer, former belt 13, powder, if it is used, would not enter between the inner and outer belts.

Although in the first and second embodiments the conveyer belt 17 that has two-layer belts is used, a conveyer belt of a single layer may be used. In that case, the degree of the tension of the part of the single-layer conveyer belt between the rollers 19 and 21 is adjusted, and the former rollers 27 in the first embodiment or the former rollers 28 and the pushing device 29 are arranged to be located between the rollers 19 and 21.

Figure 5A:
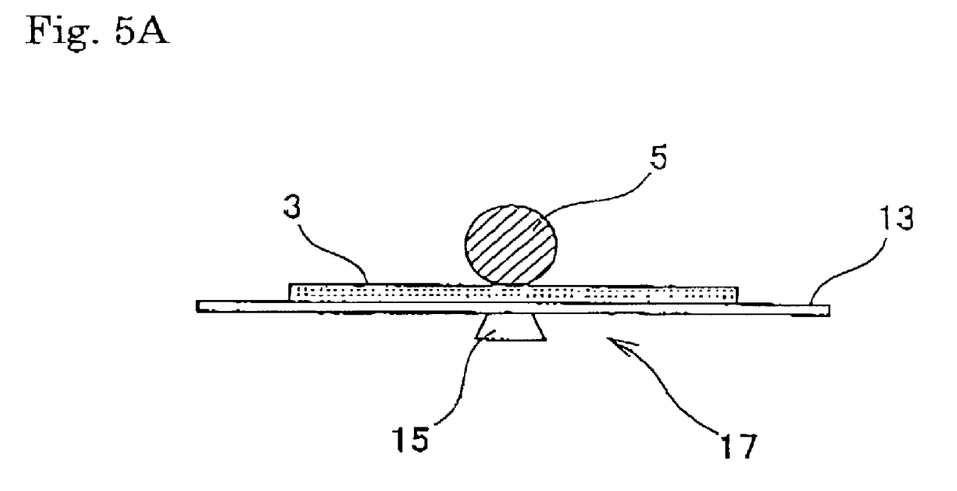
FIG. 5A is a cross-sectional view showing an alternative belt conveyer, which can be used in the first and second embodiments.
Figure 5B:
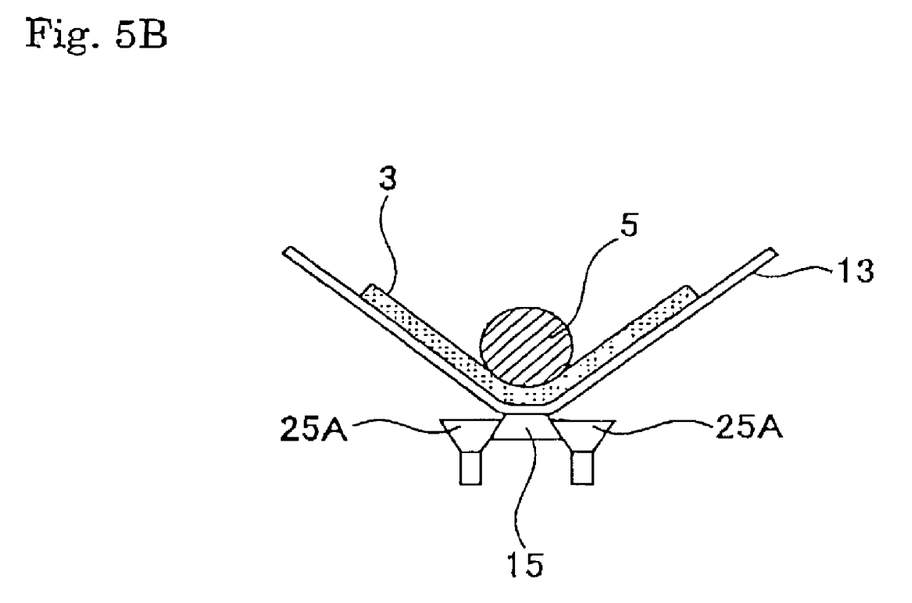
FIG. 5B is a cross-sectional view of the alternative belt conveyer, showing guiding members for the belt conveyer.

FIG. 5 shows an alternative example of the endless belt conveyer 17. As shown in FIG. 5A, the inner, base belt 15, which is fixed to the outer, forming belt 13, is narrow and in the shape of a trapezoid. As shown in FIG. 5B, the trapeziform base belt 15 may be guided to a lower position by two guide members 25A instead of the depressing rollers 25, which guide members 25A have a shape complementary to the shape of the base belt 15.

Figure 6A:
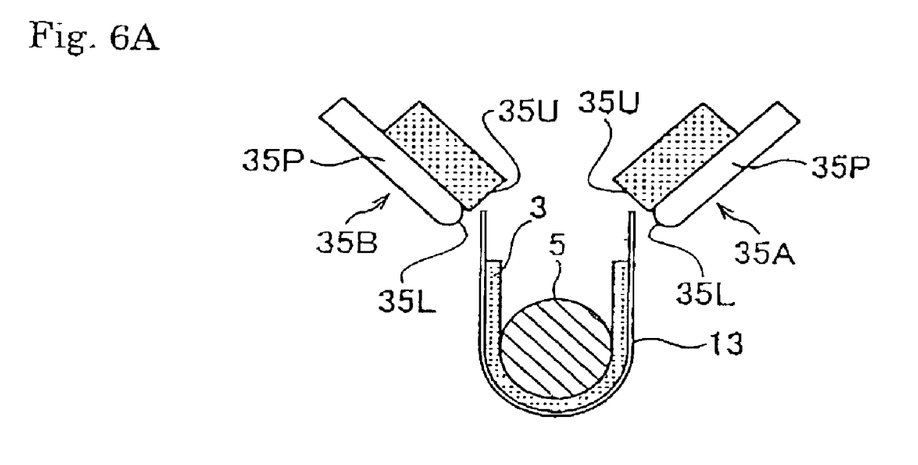
FIGS. 6A, 6B, and 6C are cross-sectional views showing the steps of the operation of alternative pushing members.

FIG. 6 shows an alternative example of the pushing members 35A, 35B shown in FIGS. 3 and 4. As shown in FIG. 6A, each of the pushing members 35A, 35B has two members, namely, an upper pushing member 35U and a lower pushing member 35L. The lower pushing member 35L is located at the distal end of a plate member 35P, and the upper pushing member 35U is placed on the plate member 35P. The upper pushing member 35U is made of resilient material.

Figure 6B:
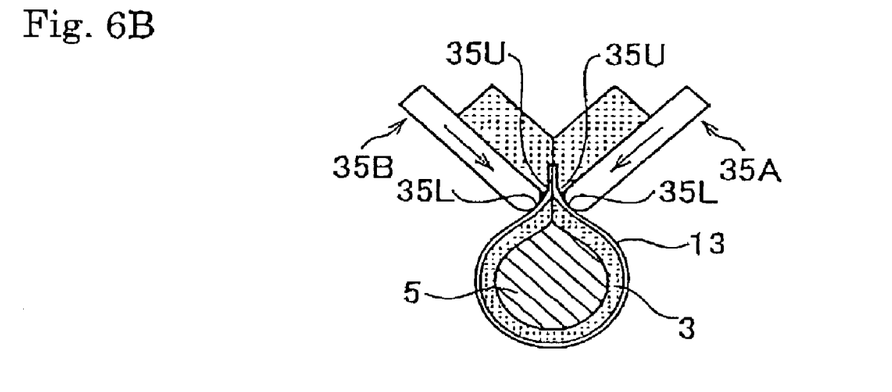
Figure 6C:
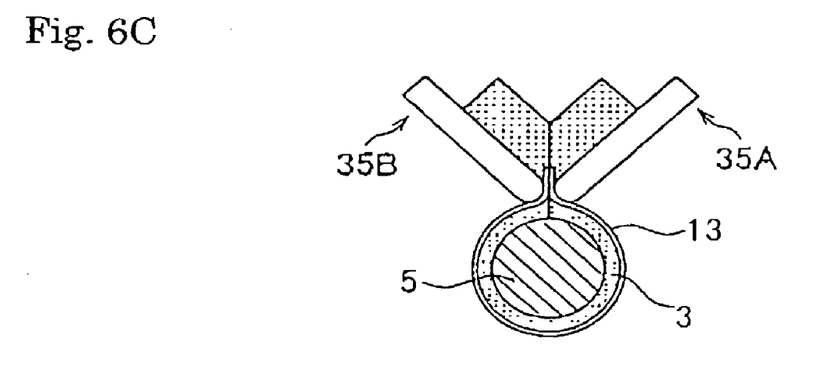

Thus, when the former belt 13 is deformed as a "U" as explained for the second embodiment, the pushing members 35A, 35B approach the edges of the former belt 13 to form the U-shaped belt 13 as a sleeve. During this operation the upper pushing members 35U, 35U first contact the edges of the former belt 13, and then the lower pushing members 35L, 35L contact the parts of the belt 13 at the points just below the edges, as shown in FIGS. 6A, 6B, and 6C. This structure is advantageous in that the outer layer material will not escape from the closed former belt 13 shaped as a sleeve, since its edges are joined first, and then the lower parts of them are pushed together.

Figure 7A:
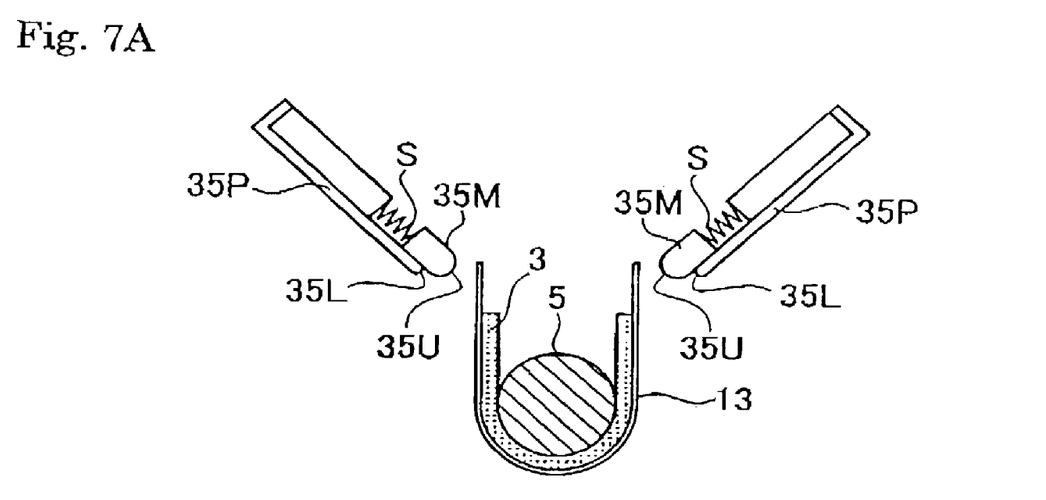
FIGS. 7A, 7B, and 7C are cross-sectional views showing the steps of the operation of alternative pushing members.
Figure 7B:
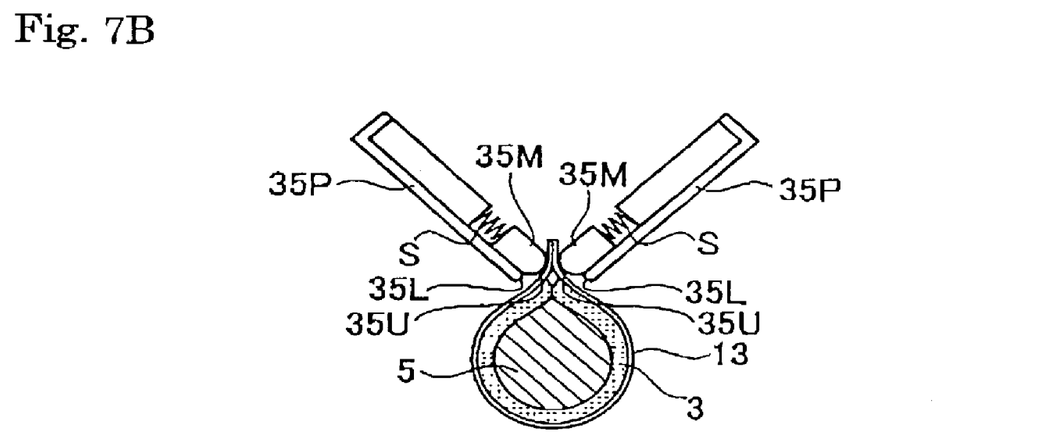
Figure 7C:
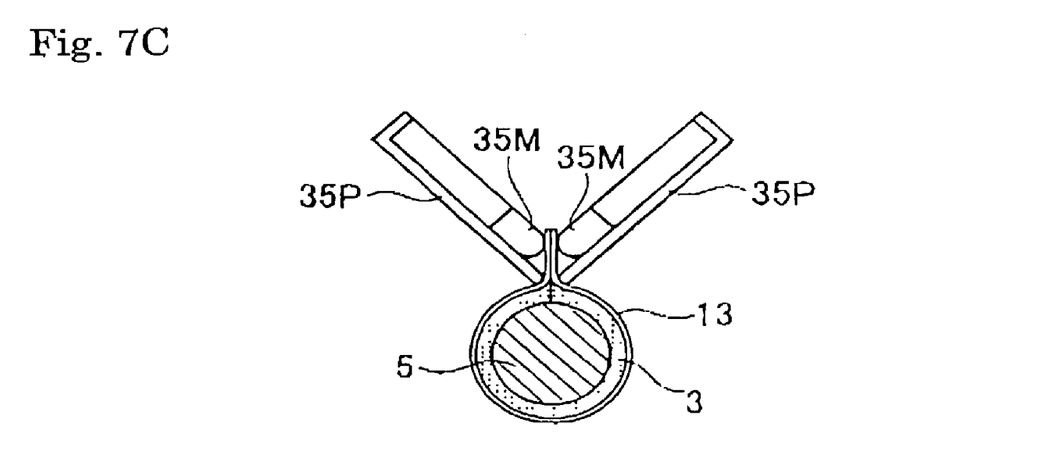

FIG. 7 shows an alternative example of the upper pushing member 35U shown in FIG. 6. The upper pushing member 35U of this alternative example has two members, namely, a distal, movable member 35M provided with a spring S (e.g., a coil spring) at its rear and a proximal member (no number is assigned to it) held in the plate member 35P. The distal, movable member 35M is connected to the proximal member through the spring S. This structure of the pushing member functions the same as do the pushing members 35A, 35B shown in FIG. 6.

The embodiments and examples explained above are exemplary only, to explain the present invention. One skilled in the art will understand that other variations and modifications can be made without departing from the spirit of the present invention.

The invention claimed is:

1. A method for producing a food shaped as a continuous bar by placing a continuous piece of inner material on a continuous strip of an outer layer material that is transferred, and by wrapping the inner material by the outer layer of material on an endless former belt supported for running by first and second guide rollers comprising the step of drawing down a central part of a former belt when the former belt is running while skewing sides of the former belt by former means located at the sides of the former belt so that edges of the former belt engage with each other thereby wrapping the inner material by the outer layer material.

2. An apparatus for producing a food shaped as a continuous bar comprising:
an endless belt having an outer endless former belt and an inner endless belt disposed inside the outer endless former belt, a central part of the outer endless former belt and a central part of the inner endless belt being connected;
first and second guide rollers for supporting the endless belt for running;
a plurality of guide members disposed between the first and second guide rollers at a level lower than the level of the first and second guide rollers, for drawing down the inner endless belt and the central part of the outer endless former belt to a level lower than a level of upper surfaces of the first and second guide rollers when the endless belt comes to an upper passage part of a passage thereof; and
former means disposed at sides of the outer endless former belt at the upper passage part for skewing sides of the outer endless former belt.

3. The apparatus of claim 2, further comprising pushing means for pushing and joining edges of the sides of the outer endless former belt.

4. The apparatus of claim 3, wherein the pushing means includes first pushing parts for pushing and joining the edges of the sides of the outer endless former belt and second pushing parts for pushing parts of the sides below the edges.

5. A seamless, endless conveyor belt for the apparatus of claim 2 comprising:
a seamless, continuous outer endless former belt; and
an inner endless belt fixed at a central part thereof to a central part of the outer endless former belt for drawing down and guiding the central part of the outer endless former belt when the endless conveyor belt comes to an upper passage part of a passage thereof.

6. The seamless, endless conveyor belt of claim 5, wherein the inner endless belt is narrower than the seamless, continuous, outer endless former belt.

7. The apparatus of claim 2 further including a plurality of members for moving vibratingly to approach close to and move away from each other to join edges of the outer endless former belt to form the outer endless former belt as a sleeve.

* * * * *